United States Patent [19]

MacDermott et al.

[11] 4,407,075
[45] Oct. 4, 1983

[54] ILLUMINATED SPIRIT VIAL AND LEVEL

[75] Inventors: Carl H. MacDermott, Bridgewater; Richard S. Brown, Jr., North Attleboro, both of Mass.

[73] Assignees: Louis Rains, Weymouthport; Arthur Albert Smith, Jr., Norwell, both of Mass.

[21] Appl. No.: 326,849

[22] Filed: Dec. 3, 1981

[51] Int. Cl.³ .............................................. G01C 9/32
[52] U.S. Cl. ................................ 33/348.2; 33/379; 362/120
[58] Field of Search .................. 33/348, 348.2, 366, 33/379; 362/101, 109, 119, 120

[56] References Cited

U.S. PATENT DOCUMENTS

| 1,760,727 | 5/1930 | Von Hofe | 33/348 |
| 2,752,693 | 7/1956 | Wullschleger | 33/379 |
| 2,944,144 | 7/1960 | Naylor | 33/348.2 |
| 3,584,212 | 6/1971 | Hansen | 33/348.2 |
| 3,863,067 | 1/1975 | Gooley | 33/366 |
| 3,878,618 | 4/1975 | Freeman | 33/379 |

FOREIGN PATENT DOCUMENTS

| 370798 | 3/1923 | Fed. Rep. of Germany | 33/348 |
| 750088 | 12/1944 | Fed. Rep. of Germany | 33/348.2 |
| 836728 | 6/1960 | United Kingdom | 33/348 |

Primary Examiner—Richard R. Stearns
Attorney, Agent, or Firm—Herbert L. Gatewood

[57] ABSTRACT

A tubular-shaped spirit vial is provided which is capable of being illuminated at its ends, offering improved observation of the spirit bubble location. The spirit vial has particular application in carpenter's and other tradesperson's levels providing greater ease in making, and more accurate, horizontal and vertical level determinations in poorly lighted work areas and against dark wood.

9 Claims, 6 Drawing Figures

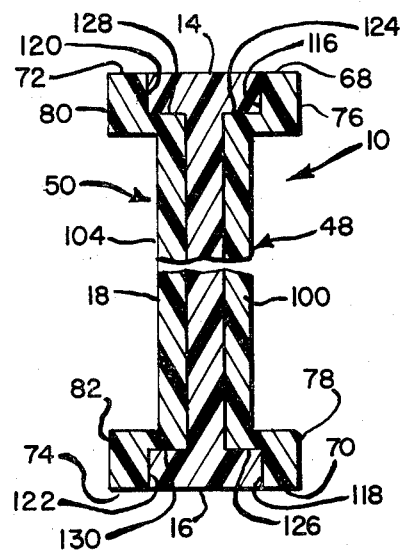
Fig. 2
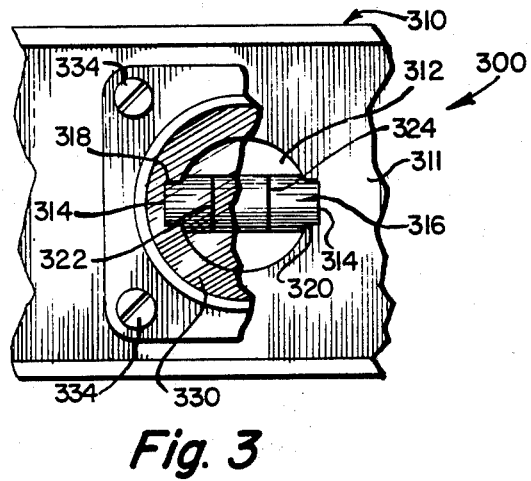
Fig. 3
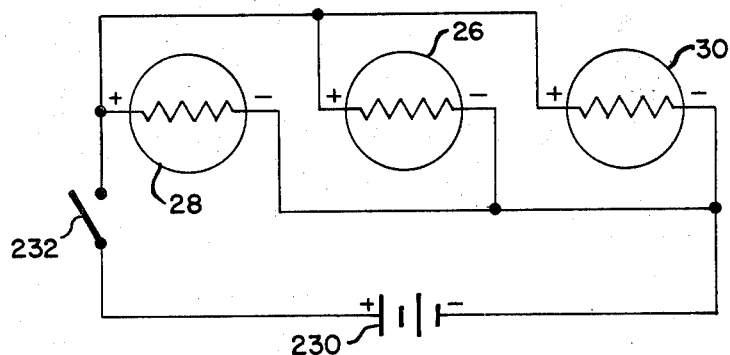
Fig. 4
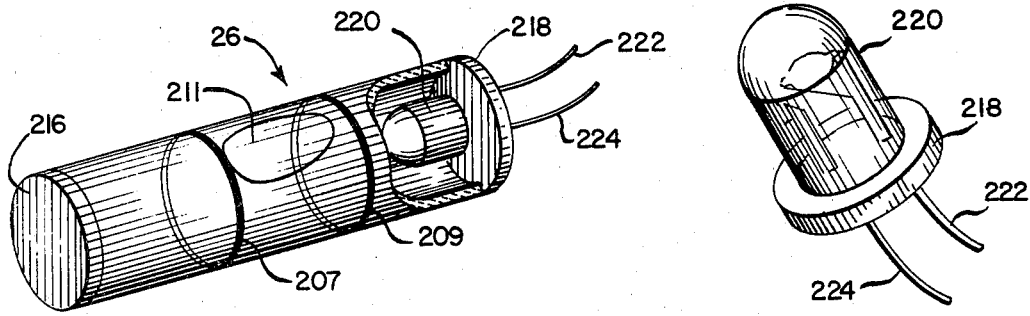
Fig. 5
Fig. 6

ILLUMINATED SPIRIT VIAL AND LEVEL

BACKGROUND OF THE INVENTION (1) Field of the Invention

This invention pertains to an illuminated spirit bubble vial and, in particular, to a trademan's level incorporating such a vial.

(2) Description of the Prior Art

Over the years, wherever spirit bubble levels have been encountered, e.g., in carpenter's and other tradesperson's levels, in various instruments such as sextants and octants, on artillery pieces, and on various industrial equipment which must be leveled, reading the spirit bubble level has sometimes been a most difficult problem. Oftentimes, the equipment incorporating the level is located in an area which is provided with poor lighting, or in which no lighting exists at all, or the level must be observed at night, or during a time when natural lighting is poor.

Working conditions encountered by carpenters, masons, electricians, steam fitters and allied tradespersons in building construction and maintenance are such that it is not unusual for them to be required to read a level under poor lighting conditions. This problem is somewhat compounded in the event the work against which the level is placed is of a dark color. And cloudy or rainy days cause additional problems.

As a result of the problems encountered in reading spirit or bubble levels, substantial efforts have been devoted over the years to the development of spirit level constructions with a view to enhancing or intensifying the bubble image. In some cases this has merely involved the providing of a luminescent, color contrasting, or reflecting background against which the bubble level is viewed. However, in a substantial number of cases, efforts have been made to provide illumination to the spirit level cavity.

None of the lighted levels of which we are aware, however, prior to our invention of a lighted level, disclosed in U.S. patent application Ser. No. 219,996, filed Dec. 23, 1980, now abandoned, the disclosure of which is herein incorporated, provided entirely satisfactory performance. All of the earlier lighted levels, as far as we know, used flash light bulbs. In many instances, however, the location of the light bulb was such that the spirit bulb was not well lighted. In some cases the location of the light bulb actually interferred with reading the level, as the light bulb was located directly in the observer's field of vision. Sometimes the spirit vials were not uniformly lighted; for example, where a light bulb was located on one side of a pair of spirit vials, one vial was relatively well lighted, and the other hardly at all.

As will be well appreciated, however, probably the most serious problem with lighted levels utilizing light bulbs as the source of light is that the bulbs have to be periodically replaced. Light bulbs burn out, and with little or no warning. A level with a burned out bulb can be even more useless to a carpenter or other tradesperson than a level that is not of the so-called "illuminated type". This is because the worker is depending on its lighting facility in a poorly lighted area and accordingly may not come prepared with other lighting means, e.g., a flash light, in the event of a failure to light. A match, moreover, may or may not be handy. Of consequence also, and in addition to bulbs burning out, is the fact that light bulbs are subject to breakage, in the event of a severe shock, if the level is accidentally dropped.

Oftentimes the construction of the level has been such that burned out, or broken, light bulbs have not been easily and readily replaced. In any event, the tradesperson can only be assured of having an illuminated level which always lights by always carrying an inventory of spare light bulbs. This is a particular nuisance as a level having three sight level cavities necessitates an inventory of at least two light bulbs. Nevertheless, it is seldom that all the light bulbs in the level will burn out at one time. Accordingly, the aggravation of replacing burned out light bulbs is further compounded, in that replacement of burned out light bulbs will be necessitated at various times.

SUMMARY OF THE INVENTION

Accordingly, we have invented a new spirit vial provided in combination with a means for illumination not attendant with the problems encountered with such vials which have been illuminated by light bulbs heretofore. The illuminated vials of this invention are illuminated by means that not only are shock proof and not subject to breakage but which, quite advantageously, will not burn out. Thus, there are no lighting means which need be replaced, as in the case where light bulbs are used.

The illuminated spirit vial of this invention is, in general, of a tubular-shape in the ends of which are located cylindrical-shaped plugs for sealing in the spirit vial fluid, and in at least one of which plugs is centrally provided a light emitting diode (L.E.D.) which is capable of being energized from time-to-time, as desired, by suitable battery means. Thus, the spirit bubble is made more readily observable wherever a lack of light, or poor lighting conditions, are encountered.

The illuminated spirit vial of the invention can be used wherever spirit vials are now conventionally used, and with much advantage. Thus, there is provided in accordance with a further aspect of the invention, an illuminated level for use by carpenters and other tradespersons which comprises in its broadest construction an elongated body member having spaced-apart, parallel, planar work contacting surfaces; at least one spirit vial cavity located in said elongated body member; at least one tubular-shaped spirit vial mounted in each said at least one spirit vial cavity; light source located in at least one of the ends of the tubular-shaped spirit vials for illuminating the spirit level vial when energized; and means for energizing the light source intermittently as desired.

BRIEF DESCRIPTION OF THE DRAWINGS

The invention is described in greater detail hereinafter, reference being made to the drawing, to facilitate understanding of the invention, in which:

FIG. 2 is a view in cross-section of the level shown in FIG. 1, without the cover plates being assembled thereto, taken at the left end;

FIG. 3 is a fragmentary view with parts broken away of another level construction according to the invention;

FIG. 4 is a schematic illustration showing, the wiring of the illuminated carpenter's level of FIG. 1;

FIG. 5 is a perspective view of an illuminated spirit vial of the invention; and FIG. 6 is a perspective view of one of the end plugs of the spirit vial shown in FIG. 5, showing the location of the illuminating means.

DETAILED DESCRIPTION OF THE INVENTION AND THE PREFERRED EMBODIMENTS

Figure 1:
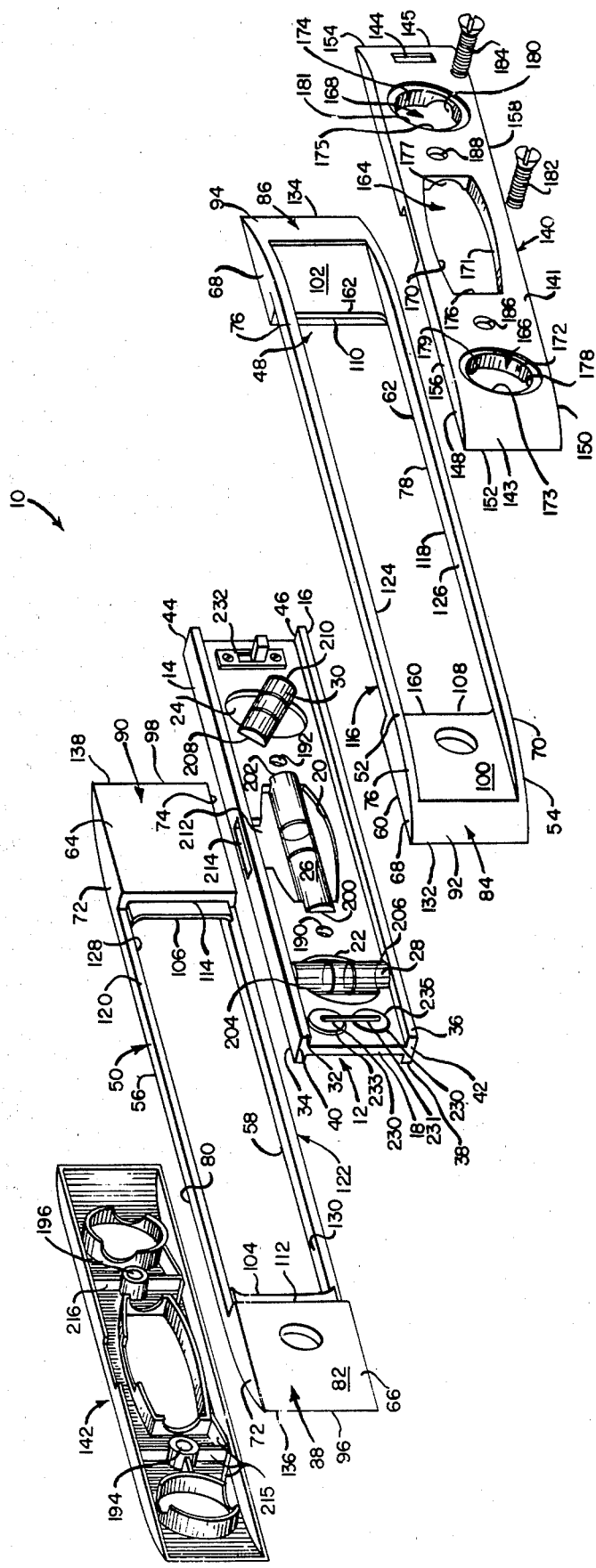
FIG. 1 is an exploded perspective view of an illuminated carpenter's level in accordance with the invention.

Referring now to the drawing, there is shown in FIG. 1 thereof an illuminated carpenter's level 10 in accordance with the invention comprising an elongated body member 12 of I-beam construction having planar work contacting surfaces 14, 16 in parallel planes with respect to one another. These horizontally disposed work contacting surfaces are connected by web section 18 of uniform cross-section throughout its length which, as disclosed in the drawing, is provided with spirit vial openings 20, 22, and 24 for location of spirit or bubble vials 26, 28, and 30, respectively.

Work contacting surfaces 14, 16 are defined by longitudinal edges 32, 34 and 36, 38; and ends 40, 42 and 44, 46, respectively. Edges 32 and 34 are parallel to one another, as are edges 36 and 38; edges 32 and 36 being in the same vertical plane. And edges 34 and 38 are in the same vertical plane parallel to the plane defined by edges 32, 36. The ends 40, 42 are in the same vertical plane, this plane being perpendicular to that defined by the longitudinal edges, and parallel to the plane defined by ends 44, 46.

As shown by the drawing, body member 12 is provided within a housing or skeletal framework consisting of two divided parts, or halves, providing in a sense a front member 48 and a back member 50. These members, as will be seen from the drawing are defined, respectively, by outer top and bottom edges 52, 54; 56, 58 and inner top and bottom edges 60, 62; 64, 66. These top and bottom edges are defined by planar top and bottom horizontally disposed surfaces 68, 70; and 72, 74; and vertically disposed surfaces 76, 78; and 80, 82, the vertically disposed surfaces in each member being in the same vertical plane, perpendicular to the parallel planes formed by the horizontally disposed top and bottom surfaces.

Top and bottom surfaces 68, 70; 72, 74 are connected respectively by vertically disposed webs 84, 86; and 88, 90 which as seen from the drawing each comprises, respectively, a first portion 92, 94, 96, and 98; and an integral indented portion 100, 102, 104, and 106. The outer surfaces of the indented web portions in each member are in the same vertical plane, as will be appreciated by reference to FIG. 2 of the drawing; which plane is parallel to the plane defined by inner top and bottom edges 60, 62; and 64, 66. The inner surfaces of the webs 84, 86 and 88, 90 are planar, these web surfaces however, in each member being provided with a rectangular shaped indentation intermediate the top and bottom surfaces, as designated by reference numerals 108, 110, 112, 114, the purpose for which will be later explained, if not already obvious.

These inner top and bottom edges in members 48, 50 as will be seen from the drawing, are indented intermediate the ends of the members providing channels defined by vertically disposed planar, parallel, inner surfaces 116, 118; 120, 122, and horizontally disposed surfaces 124, 126; 128, 130, for contact with body member 12, as later disclosed. The outer top and bottom edges are tapered inwardly at their respective ends providing a smooth curve from where the indentation is made on the inner edges to the ends 132, 134; 136, 138. Web first portions 92, 94; 96, 98 are curved in similar fashion thus providing the webs in the same curved plane as the respective outer edges which they connect.

When mated together by appropriate fastening means, such as rivets or adhesive, front and back members 48, 50 provide with body member 12 a unitary level construction, the edges of the body member mating with the channels formed by the inner edge of the front and back members. The indentations provided on the inner surfaces of the indented web portions of members 48, 50 provide a recess for reception of the ends of vertically disposed web section 18. As will be appreciated front and back members 48, 50 provide symmetry in construction to the I-beam cross-sectional configuration of body member 12, the inner top and bottom edges being, when mated together, in alignment with the longitudinal center line or plane of body member 12, as defined by vertically disposed web section 18.

The construction of level 10 is completed by front and back cover plates 140, 142 which not only offer protection to the bubble vials against breakage but also provide their securement laterally in body member 12, as will be hereinafter more fully disclosed. The configuration of the two cover plates is essentially the same, the one plate being the mirror image of the other. And the front plate is provided with a rectangular-shaped cut-out 144 for light switch 232, later described, mounted on body member 12. Accordingly, only the configuration of front cover plate 140 will be fully described.

The front cover plate 140 is of a rectangular shape having a vertically disposed face 141 defined by top and bottom edges, 148, 150 and end edges 152, 154. As will be seen from the drawing, the top and bottom edges are defined by horizontally disposed planar surfaces 156, 158 that extend from face 141 perpendicularly inwardly toward body member 12. The width of these surfaces is such that when the face plate is in mating contact with web section 18 of the body member 12, the outer vertical surfaces 76, 78 are in the same plane as face 141, intermediate its tapered ends. It will be appreciated that face plate 140 extends longitudinally only to the vertically disposed edges 160, 162 defining the inner vertical edges of the indented web portions 100, 102. The face 141 extends in a vertical plane parallel to web section 18 and as indicated tapers inwardly at its ends 143, 145 toward edges 160, 162, respectively.

Cover plate 140 is provided with three longitudinally disposed openings 164, 166, 168 which correspond in location and, are of the same configuration as vial openings 20, 22, 24, respectively, in body member 12, but of a slightly smaller dimension. These openings are each defined respectively by internally extending horizontally disposed surfaces 170, 171; 172, 173; 174, 175 defined, in general, by the shape of the particular opening. In each of these surfaces are provided opposed semi-circular-shaped notches or cut-outs, e.g. notches 176, 177; 178, 179; 180, 181 for mating contact with respective spirit vials 26, 28, and 30. As will be appreciated, when the front and back cover plates are associated with web section 18 and joined together in combination therewith, the semi-circular-shaped notches will form a circular retainer for the ends of the tubular-shaped vials, establishing the vials center lines in lateral location with respect to the vertical center line of web section 18 and preventing accidental lateral displacement.

In practice cover plates 140, 142 are held together, and in combination with body member 12, by screws 182, 184 which extend through openings 186, 188 in the front cover plate and openings 190, 192 in body member 12 into dead bores 194, 196 extending internally inwardly from back cover plate 142.

As can best be viewed in FIG. 1, the vial openings 20, 22, 24 are provided with respective pairs of diametrically opposed notches 200, 202; 204, 206; 208, 210, each notch having the configuration of an open sided rectangle. The notch defining surfaces lie at substantially right angles to the plane of web section 18, their dimensions and spacing being maintained within relatively close tolerances to produce the required fit and orientation between the body member 12 and the spirit vials. Notches 200, 202 provide the longitudinal axis of vial 26 parallel to work contacting surfaces 14, 16. The opening for this vial, as will be seen from the drawing is of a barrel shape, the barrel's length-wise dimension being oriented longitudinally with respect to body member 12. However, it can be of a different shape, e.g. circular if desired, depending somewhat on the size level desired and the size spirit vial. Optionally, web section 18 can be cut-out, as indicated by reference numeral 212, providing with the rectangular-shaped opening 214 in work contacting surface 14 means for viewing the bubble in vial 26.

Vial openings 22 and 24 are of circular configuration, the vial locating notches in each being provided outside the circular shaped opening, as is indicated. The notches in vial opening 22 are located such that these notches receive vial 28 and align its longitudinal axis perpendicular to the work contacting surfaces. The vial in opening 24 is provided at a 45 degree angle with respect to work contacting surfaces 14, 16; however, other angular relationships can be provided if desired.

Body member 12 can be provided from metal, desirably an aluminum extrusion, having a generally I-shaped cross-section, the top and bottom work contacting surfaces being precision machined and defining parallel planes with respect to one another. The surrounding skeletal frame work housing body member 12 can be die-cast from aluminum, in which case the work contacting surfaces may not be machined until after assembly of the housing with the body member. It will be appreciated that body member 12 need not be enclosed within the housing frame work disclosed, this depending somewhat upon the dimensions of the level construction involved.

The notches in body member 12 for locating the spirit vials can be provided by various known techniques, e.g. broaching. Neither the body member 12 or the housing frame work need, however, be provided of metal. These components can be provided of various known plastic materials, e.g. nylon, polyacetal resin, acrylonitrile-butadiene-styrene copolymer (ABS resin), acrylic thermoplastic polymers, etc., by conventional molding or extrusion techniques, depending on the cross-sectional configuration desired. However, it will be appreciated that, in particular, body member 12, if of plastic, can be machined from stock.

Cover plates 140, 142 can be of plastic, e.g. polyvinyl chloride, the outer surface 141 of which is of a decorative matted finish, or smooth, as desired. The inner, or back surface can be ribbed as indicated by reference numeral 215, providing somewhat better structural strength to the relatively thin, hollowed-out cover plate.

The vials are manufactured from a transparent material such as plastic or glass which is extruded in tubular form. The plastic generally used for vial production is an acrylic thermoplastic polymer. This material was selected in this instance for its high degree of transparency, dimensional stability and its workability in high speed mass production processes. However, other materials having similar properties can also be used in producing vials used in this invention, if desired. The vials, as shown in the drawing, are of a cylindrical shape; however, these vials can be barrel shaped as set forth in U.S. Pat. No. 3,311,990, the entire disclosure of which is herein incorporated, if desired. In any event the vials are precision produced by extrusion or machining to register in secure engagement with the mounting notches provided in web section 18.

Each of the vials, as shown by reference to FIG. 5 of the drawing is provided with annular markings or grooves 207, 209 cut into the external periphery of the vial for location of the bubble 211 when the desired angularity has been obtained. The spacing of the markings which define parallel planes will depend, of course, on the size of the bubble produced in the vial; however, the markings are spaced equidistantly from the longitudinal midpoint of the vial. The fluid introduced into the vial is sealed by cylindrical shaped plugs 216, 218. These plugs can be provided of polyvinyl chloride, and should be of such a hardness that the plugs shape will be retained, however, soft enough not to be so unyielding when inserted as to craze the bore of the vial or deform it. In combination with one of the plugs at least is provided a light emitting diode (L.E.D.) 220 which functions when energized, as hereinafter disclosed, to illuminate the spirit vial, making more readily observable the spirit vial bubble when lighting conditions are poor, or perhaps even non-existant.

The light emitting diode 220 can be of various colors, e.g. red, amber, green, yellow, as can the spirit fluid contained within the vial. Good results, however, have been obtained with a miniature, yellow diode having a diffused lens with a yellow colored spirit fluid. Such a diode is commercially available from the Tandy Corporation, Fort Worth, Tex. (Radio Shack) under the trade designation Archer Electronic Parts, Catalog No. 276-031.

Light emitting diode 220 is centrally located in circular shaped plug 218 and intrudes about $\frac{1}{8}$" into the bore of vial 26. This can be accomplished by drilling a hole in the plug large enough for inserting the L.E.D., and then sealing the outside end of the plug through which the leads 222, 224 extend with conventional plastic adhesive or cement. Somewhat better illumination can be provided by providing the inside of plug 218 with a reflective surface, e.g. a mirror coating.

The light emitting diodes in vials 26, 28, 30 are connected by suitable wiring (not shown in FIG. 1 for sake of clarity), as disclosed in FIG. 4 of the drawing, so that the diodes are all in parallel and, in turn, are in series with battery 230 and switch 232. While various conventional conductive wire will obviously be suitable, the finer the gauge the better; however, it should have high resistance to heat, in order to withstand the heat produced in making soldered connections. The switch 232 used in the practice of the invention was a conventional toggle switch. As will be appreciated, however, any type switch can be used, e.g. the push button type switch. Battery 230 comprises two conventional hearing aid batteries (Archer/Catalog No. 675/1.4 v) connected in series as shown by tie-bar 231 but other batteries can be used, if desired, dependent somewhat on the voltage requirements which in turn is determined by various factors, e.g. the number of spirit vials involved, whether L.E.D.s are provided on each end, the L.E.D.s used, etc. Batteries of the type specifically disclosed are desirable, however, as these batteries are relatively long lifed, and of light weight. Moreover, the batteries can be readily located within and retained in openings 233, 235 provided in web section 18. With levels of larger construction, however, the usual pen light battery (1.5 v) will be found suitable in some cases, as this will result in less cost in the level manufacture.

Although the invention has been disclosed with respect to a particular level construction, it will be appreciated that it is not so limited. Another level 300 of somewhat different construction is shown in FIG. 3, the parts thereof being shown in fragmentary form. As disclosed in FIG. 3, level 300 comprises a body member 310 of I-beam construction provided with three vial openings, the middle one of which is shown, as indicated by reference numeral 312. The vial opening is provided with notches 314 as earlier disclosed for location of spirit vial 316. As shown, vial 316 is provided with annular recesses 318, 320 which are in concentric relation with the longitudinal axis of the vial and have substantially identical dimensions. These recesses simplify installation of the vials in the body member. Annular grooves or other markings 322, 324 are provided according to conventional techniques for location of the spirit liquid bubble when the desired level of angularity is obtained. Although not shown for sake of simplicity, it will be appreciated that spirit vial 316 is illuminated by an L.E.D. as previously described. Transparent cover plates 330 are secured on opposite sides of the web 311 of body member 310 over vial opening 312, these being secured to the body member by screw fasteners 334. These cover plates serve the dual function of protecting the vial and of establishing the lateral alignment of the vial with respect to the web.

Thus, there is provided in accordance with one aspect of the invention an improved level, which does not require precise vial alignment in the final production phase. However, it will be appreciated that this invention is not limited to such levels. The spirit vials of the invention can be used in the manufacture of any levels provided heretofore which incorporate spirit vials, regardless of the particular construction. Furthermore, the level construction in some instances need not provide for precisely machined work contacting surfaces, as is required in carpenter's levels and the like. The level can be a simple housing of metal or plastic which encloses a single spirit vial and offers protection to the vial against breakage, in which housing is provided an opening for observation of the spirit bubble. Thus, in such a case, an elongated cubic shaped housing will suffice, the center line of the vial being located in the center line of the housing; the wiring for the L.E.D. with battery being located internally within the housing, and a toggle or push button switch being provided in the housing for activating the L.E.D. and illuminating the bubble vial as desired.

The foregoing disclosure is to be considered as merely illustrative only of the principals of our invention. Numerous modifications and changes will now readily occur to those skilled in the art. Accordingly, the invention is not deemed limited to the exact construction shown. All modifications and equivalents resorted to falling within the scope of the invention as claimed are within the parameters of the invention.

What we claim is:

1. Illuminated spirit level suitable for use by carpenters and other tradespersons comprising:
    (a) an elongated body member having spaced-apart parallel, planar work contacting surfaces;
    (b) at least one spirit vial cavity located in said elongated body member;
    (c) at least one tubular-shaped spirit vial mounted in each said at least one spirit vial cavity, a cylindrical-shaped plug located in at least one end of said at least one tubular-shaped spirit vial;
    (d) a light source centrally disposed in said cylindrical-shaped plug extending into said tubular-shaped spirit vial; and
    (e) means for energizing the light source intermittently as desired.

2. Illuminated spirit level suitable for use by carpenters and other tradespersons according to claim 1 wherein a reflective surface is provided on the inner surface of the said cylindrical-shaped plug.

3. Illuminated spirit level suitable for use by carpenters and other tradespersons according to claim 1 wherein the light source is a light emitting diode.

4. Spirit vial having a tubular-shape and being defined by first and second ends, cylindrical-shaped plugs located in the said ends of the tubular-shaped vial for sealing fluid in the vial, fluid partially filling the vial and a bubble within the vial produced by the partial filling thereof, and means located in at least one of the said ends centrally disposed in at least one of the said cylindrical-shaped plugs and extending inwardly into the tubular-shaped spirit vial for illuminating the spirit vial whereby the location of the said bubble within the vial can be more readily observed.

5. Spirit vial according to claim 4 wherein the illuminating means is a light emitting diode.

6. Spirit vial according to claim 5 wherein the light emitting diode is of a yellow color.

7. Spirit vial according to claim 6 wherein the spirit fluid is also yellow-colored.

8. Spirit vial according to claim 5 wherein the light emitting diode has a diffused lens.

9. Spirit vial ccording to claim 4 wherein the inner surface of the cylindrical-shaped plugs is reflective.

* * * * *